(12) United States Patent
Kim et al.

(10) Patent No.: US 12,017,510 B2
(45) Date of Patent: Jun. 25, 2024

(54) METHOD FOR CONTROLLING HEATING OF VEHICLE THERMAL MANAGEMENT SYSTEM

(71) Applicants: Hyundai Motor Company, Seoul (KR); Kia Corporation, Seoul (KR)

(72) Inventors: Tae Han Kim, Seoul (KR); Jae Hyun Song, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 350 days.

(21) Appl. No.: 17/519,086

(22) Filed: Nov. 4, 2021

(65) Prior Publication Data

US 2022/0324294 A1    Oct. 13, 2022

(30) Foreign Application Priority Data

Apr. 8, 2021   (KR) ........................ 10-2021-0046143

(51) Int. Cl.
| | |
|---|---|
| *B60H 1/14* | (2006.01) |
| *B60H 1/00* | (2006.01) |
| *B60K 1/04* | (2019.01) |
| *B60L 58/26* | (2019.01) |
| *B60K 1/00* | (2006.01) |

(52) U.S. Cl.
CPC ......... *B60H 1/143* (2013.01); *B60H 1/00921* (2013.01); *B60H 2001/00928* (2013.01); *B60H 2001/00949* (2013.01); *B60K 2001/005* (2013.01); *B60K 2001/006* (2013.01); *B60K 1/04* (2013.01); *B60L 58/26* (2019.02)

(58) Field of Classification Search
CPC ................ B60H 1/143; B60H 1/00921; B60H 2001/00928; B60H 2001/00949; B60K 11/02; B60K 2001/003; B60K 1/00; B60K 2001/008; B60K 1/04; B60K 2001/005; B60K 2001/006; B60L 58/26
See application file for complete search history.

(56) References Cited

U.S. PATENT DOCUMENTS

| | | | | |
|---|---|---|---|---|
| 6,464,027 | B1 * | 10/2002 | Dage ........................ | F01P 3/20 |
| | | | | 123/41.14 |
| 2005/0028542 | A1 * | 2/2005 | Yoshida .............. | H01M 10/625 |
| | | | | 62/186 |
| 2009/0249802 | A1 * | 10/2009 | Nemesh .................... | F25B 5/02 |
| | | | | 62/214 |
| 2009/0249807 | A1 * | 10/2009 | Nemesh ............. | B60H 1/00278 |
| | | | | 62/117 |

(Continued)

FOREIGN PATENT DOCUMENTS

KR    2021-0013858 A    2/2021

*Primary Examiner* — Stephen Holwerda
(74) *Attorney, Agent, or Firm* — Fox Rothschild LLP (57) ABSTRACT

A method is provided and includes activating, by a controller, a compressor of an HVAC subsystem when heating of a passenger compartment is required and determining whether a heat rejection from a powertrain component is greater than or equal to a reference heat rejection. A powertrain-side pump is activated and a battery-side pump is stopped when the heat rejection is greater than or equal to the reference heat rejection. A refrigerant circulating in the HVAC subsystem exchanges heat with a powertrain coolant having absorbed heat from the powertrain component.

8 Claims, 4 Drawing Sheets

(56) References Cited

U.S. PATENT DOCUMENTS

| | | | |
|---|---|---|---|
| 2010/0012295 A1* | 1/2010 | Nemesh | H01M 10/6568 |
| | | | 165/104.19 |
| 2014/0196674 A1* | 7/2014 | Quix | F01P 3/02 |
| | | | 123/41.44 |
| 2015/0121848 A1* | 5/2015 | Pursifull | F01N 5/02 |
| | | | 60/274 |
| 2015/0202986 A1* | 7/2015 | Hatakeyama | B60H 1/32 |
| | | | 165/287 |
| 2015/0308719 A1* | 10/2015 | Gebbie | B60H 1/00921 |
| | | | 62/324.1 |
| 2015/0333379 A1* | 11/2015 | Janarthanam | H01M 10/48 |
| | | | 429/61 |
| 2016/0053665 A1* | 2/2016 | Gonze | F01P 7/167 |
| | | | 123/41.08 |
| 2021/0031592 A1 | 2/2021 | Kim et al. | |
| 2022/0097705 A1* | 3/2022 | Hall | B60W 30/18109 |
| 2022/0134905 A1* | 5/2022 | Cox | B60L 3/0046 |
| | | | 429/71 |

\* cited by examiner

METHOD FOR CONTROLLING HEATING OF VEHICLE THERMAL MANAGEMENT SYSTEM

CROSS-REFERENCE TO RELATED APPLICATION

This application is based on and claims the benefit of priority to Korean Patent Application No. 10-2021-0046143, filed on Apr. 8, 2021, the disclosure of which is incorporated herein in its entirety by reference.

TECHNICAL FIELD

The present disclosure relates to a method for controlling heating of a vehicle thermal management system, and more particularly, to a method for controlling heating of a vehicle thermal management system in which a refrigerant circulating in a heating, ventilation, and air conditioning (HVAC) subsystem selectively recovers heat from ambient air and/or waste heat from electric/electronic components according to the driving conditions, charging conditions of the vehicle and the heating operation conditions of the HVAC subsystem during the heating operation of the HVAC subsystem.

BACKGROUND

With a growing interest in energy efficiency and environmental issues, there is a demand for development of eco-friendly vehicles that can replace internal combustion engine vehicles. Such eco-friendly vehicles are divided into electric vehicles which are driven by using fuel cells or electricity as a power source and hybrid vehicles which are driven using an engine and a battery system.

Existing electric vehicles and hybrid vehicles have employed an air-cooled battery cooling system using interior cold air. In recent years, research is underway on a water-cooled battery cooling system that cools the battery by water cooling in order to extend all electric range (AER) to 300 km (200 miles) or more. Specifically, energy density may be increased by adopting a structure that cools the battery in a water-cooled manner using a heating, ventilation, and air conditioning (HVAC) system, a radiator, and the like. In addition, the water-cooled battery cooling system may make the battery system compact by reducing gaps between battery cells, and improve battery performance and durability by maintaining a uniform temperature between the battery cells.

To implement the above-described water-cooled battery cooling system, research is being conducted on a vehicle thermal management system integrated with a powertrain cooling subsystem for cooling an electric motor and electric/electronic components, a battery cooling subsystem for cooling a battery, and an HVAC subsystem for heating or cooling air in a passenger compartment. The HVAC subsystem includes a refrigerant loop fluidly connected to an evaporator, a compressor, a condenser, and an expansion valve located on the upstream side of the evaporator, and a refrigerant may circulate through the refrigerant loop.

The powertrain cooling subsystem includes a powertrain coolant loop fluidly connected to the electric/electronic components (an electric motor, an inverter, etc.), and a coolant may circulate through the powertrain coolant loop. The coolant circulating through the powertrain coolant loop may be cooled by a radiator.

The battery cooling subsystem includes a battery coolant loop fluidly connected to the battery and a battery chiller, and a coolant may circulate through the battery coolant loop. The battery chiller may be configured to transfer heat between a branch line branching off from the refrigerant loop and the battery coolant loop. In the battery chiller, the coolant cooled by the refrigerant may cool the battery.

Since a general electric vehicle does not have an internal combustion engine, it cannot utilize waste heat from the internal combustion engine, so it is configured to heat the passenger compartment using an electric heater. The coefficient of performance (COP) of the electric heater is 0.8-0.9, while the COP of the HVAC subsystem (heat pump system) is 2.5. Thus, it may be better to heat the passenger compartment by the heating operation of the HVAC subsystem to increase the all-electric range.

For example, since the power consumed during the heating operation of the HVAC subsystem is reduced by approximately 24% compared to the power consumed by the electric heater, the all-electric range may be improved by the heating operation of the HVAC subsystem. The all-electric range of the electric vehicle, while driving, is reduced by approximately 27% when the HVAC subsystem operates in cooling mode, compared to when the HVAC subsystem does not operate. In addition, the all-electric range of the electric vehicle, while driving, is reduced by approximately 45% when the HVAC subsystem operates in heating mode, compared to when the HVAC subsystem does not operate.

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

An aspect of the present disclosure provides a method for controlling heating of a vehicle thermal management system in which a refrigerant circulating in a heating, ventilation, and air conditioning (HVAC) subsystem may selectively recover heat from ambient air and/or waste heat from electric/electronic components according to the driving conditions, charging conditions of the vehicle, the heating operation conditions of the HVAC subsystem, etc. during the heating operation of the HVAC subsystem, thereby achieving evaporation performance of the refrigerant.

According to an aspect of the present disclosure, a method for controlling heating of a vehicle thermal management system including an HVAC subsystem may include: activating, by a controller, a compressor of the HVAC subsystem when heating of a passenger compartment is required; determining, by the controller, whether a heat rejection from a powertrain component is greater than or equal to a reference heat rejection; and activating, by the controller, a powertrain-side pump and stopping a battery-side pump when the heat rejection is greater than or equal to the reference heat rejection, wherein a refrigerant circulating in the HVAC subsystem may exchange heat with a powertrain coolant having absorbed heat from the powertrain component.

The method may further include activating, by the controller, the powertrain-side pump and the battery-side pump when the heat rejection is less than the reference heat rejection, wherein the refrigerant circulating in the HVAC subsystem may exchange heat with a battery coolant having absorbed heat from ambient air while exchanging heat with the powertrain coolant having absorbed heat from the powertrain component. The battery-side pump may be configured to allow the battery coolant to pass through a battery radiator, the battery radiator may be configured to contact the ambient air, and the powertrain-side pump may be configured to allow the powertrain coolant to pass through the powertrain component.

The method may further include: monitoring, by the controller, a temperature of the powertrain coolant having absorbed heat from the powertrain component and a temperature of the battery coolant having absorbed heat from the ambient air; calculating, by the controller, a temperature difference value between the temperature of the powertrain coolant and the temperature of the battery coolant; and determining, by the controller, whether the temperature difference value is greater than or equal to a reference value, wherein the controller may be configured to determine that the heat rejection is greater than or equal to the reference heat rejection when the temperature difference value is greater than or equal to the reference value, and the controller may be configured to determine that the heat rejection is less than the reference heat rejection when the temperature difference value is less than the reference value.

The temperature of the powertrain coolant may be measured by a first coolant temperature sensor which is disposed on the downstream side of the powertrain component along a flow direction of the powertrain coolant, and the temperature of the battery coolant may be measured by a second coolant temperature sensor which is disposed on the downstream side of the battery radiator along a flow direction of the battery coolant.

According to another aspect of the present disclosure, a method for controlling heating of a vehicle thermal management system including an HVAC subsystem may include: activating, by a controller, a compressor of the HVAC subsystem when heating of a passenger compartment is required; determining, by the controller, whether a heat load required for a heating operation of the HVAC subsystem is lower than or equal to a first reference load; and activating, by the controller, a battery-side pump and stopping a powertrain-side pump when the heat load is lower than or equal to the first reference load, wherein a refrigerant circulating in the HVAC subsystem may exchange heat with a battery coolant having absorbed heat from ambient air, and the battery-side pump may be configured to operate at a first RPM.

The method may further include: determining, by the controller, whether the heat load exceeds the first reference load and is lower than or equal to a second reference load; and activating, by the controller, the powertrain-side pump and the battery-side pump when the heat load exceeds the first reference load and is lower than or equal to the second reference load, wherein the second reference load may be higher than the first reference load, the refrigerant circulating in the HVAC subsystem may exchange heat with a powertrain coolant having absorbed heat from a powertrain component and the ambient air while exchanging heat with the battery coolant having absorbed heat from the ambient air, the battery-side pump may be configured to operate at a second RPM greater than the first RPM, and the powertrain-side pump may be configured to operate at a fourth RPM.

The method may further include: determining, by the controller, whether the heat load exceeds the second reference load and a heat rejection from the powertrain component is less than a heat capacity generated by the heating operation of the HVAC subsystem; and activating, by the controller, the powertrain-side pump and the battery-side pump when the heat load exceeds the second reference load and the heat rejection is less than the heat capacity. The refrigerant circulating in the HVAC subsystem may exchange heat with the powertrain coolant having absorbed heat from the powertrain component and the ambient air while exchanging heat with the battery coolant having absorbed heat from the ambient air, the battery-side pump may be configured to operate at a third RPM greater than the second RPM, and the powertrain-side pump may be configured to operate at a fifth RPM greater than the fourth RPM.

The method may further include: blocking the powertrain coolant from passing through a powertrain radiator and allowing the powertrain coolant to pass through the powertrain component when the heat load exceeds the second reference load and the heat rejection is greater than or equal to the heat capacity; and activating, by the controller, the powertrain-side pump and stopping the battery-side pump. The refrigerant circulating in the HVAC subsystem may exchange heat with the powertrain coolant having absorbed heat from the powertrain component, and the powertrain-side pump may be configured to operate at the fifth RPM.

The battery-side pump may be configured to allow the battery coolant to pass through a battery radiator, the powertrain-side pump may be configured to allow a powertrain coolant to pass through a powertrain component and a powertrain radiator, the battery radiator may be configured to contact the ambient air, and the powertrain radiator may be configured to contact the ambient air.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

In this specification, the term "heat load" is defined as the amount of heat required to maintain a desired heating temperature set by a user or automatically set by a controller according to interior/exterior conditions of the vehicle, etc.

In this specification, the term "heat capacity" is defined as the amount of heat that an interior condenser in a heating, ventilation, and air conditioning (HVAC) subsystem provides to a passenger compartment when the HVAC subsystem operates in heating mode.

Figure 1:
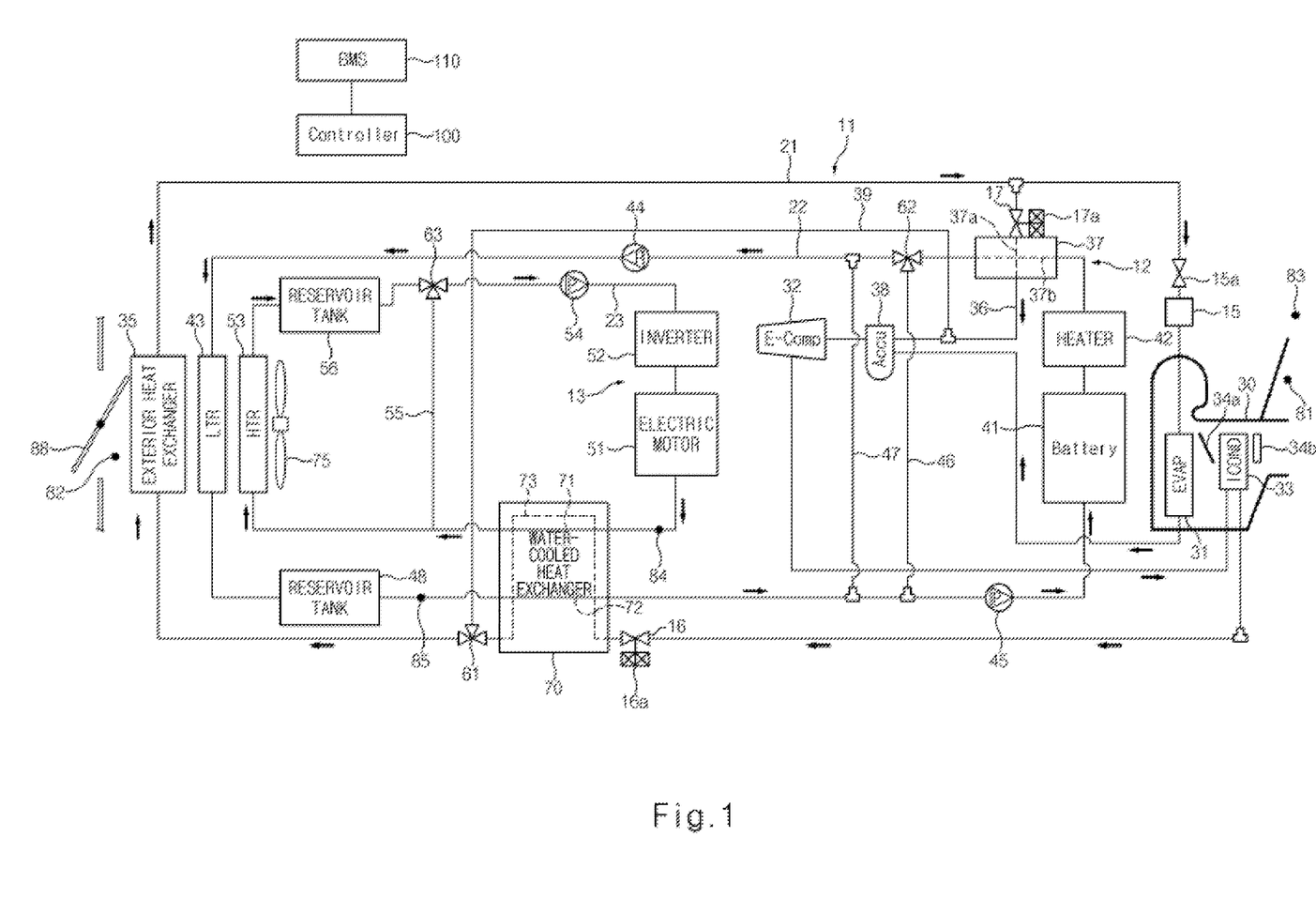
FIG. 1 illustrates a vehicle thermal management system according to an exemplary embodiment of the present disclosure.

Referring to FIG. 1, a vehicle thermal management system according to an exemplary embodiment of the present disclosure may include an HVAC subsystem 11 having a refrigerant loop 21 through which a refrigerant circulates, a battery cooling subsystem 12 having a battery coolant loop 22 through which a battery coolant for cooling a battery pack 41 circulates, and a powertrain cooling subsystem 13 having a powertrain coolant loop 23 through which a powertrain coolant for cooling powertrain components (an electric motor 51 and electric/electronic components 52) circulates.

The HVAC subsystem 11 may be configured to heat or cool air in the passenger compartment of the vehicle using the refrigerant circulating in the refrigerant loop 21. The refrigerant loop 21 may be fluidly connected to an evaporator 31, a compressor 32, an interior condenser 33, a heating-side expansion valve 16, a water-cooled heat exchanger 70, an exterior heat exchanger 35, and a cooling-side expansion valve 15. In FIG. 1, the refrigerant may sequentially pass through the compressor 32, the interior condenser 33, the heating-side expansion valve 16, the water-cooled heat exchanger 70, the exterior heat exchanger 35, the cooling-side expansion valve 15, and the evaporator 31 through the refrigerant loop 21.

The evaporator 31 may be configured to evaporate the refrigerant received from the cooling-side expansion valve 15. In other words, the refrigerant expanded by the cooling-side expansion valve 15 may be evaporated by absorbing heat from the air in the evaporator 31. During a cooling operation of the HVAC subsystem 11, the evaporator 31 may be configured to cool the air using the refrigerant cooled by the exterior heat exchanger 35 and expanded by the cooling-side expansion valve 15, and the air cooled by the evaporator 31 may be directed into the passenger compartment.

The compressor 32 may be configured to compress the refrigerant received from the evaporator 31 and/or a battery chiller 37. According to an exemplary embodiment, the compressor 32 may be an electric compressor which is driven by electric energy. The interior condenser 33 may be configured to condense the refrigerant received from the compressor 32, and accordingly the air passing through the interior condenser 33 may be heated by the interior condenser 33. As the air heated by the interior condenser 33 is directed into the passenger compartment, the passenger compartment may be heated. The refrigerant condensed in the interior condenser 33 may have a relatively low temperature, therefore the low-temperature refrigerant may flow into the water-cooled heat exchanger 70.

The exterior heat exchanger 35 may be disposed adjacent to a front grille of the vehicle. Since the exterior heat exchanger 35 is exposed to the outside, heat may be transferred between the exterior heat exchanger 35 and the ambient air. An active air flap 88 may open and close the front grille of the vehicle. During the cooling operation of the HVAC subsystem 11, the exterior heat exchanger 35 may be configured to condense the refrigerant received from the interior condenser 33. In other words, the exterior heat exchanger 35 may operate as an exterior condenser that condenses the refrigerant by transferring heat to the ambient air during the cooling operation of the HVAC subsystem 11. During a heating operation of the HVAC subsystem 11, the exterior heat exchanger 35 may be configured to evaporate the refrigerant received from the water-cooled heat exchanger 70. In other words, the exterior heat exchanger 35 may operate as an exterior evaporator that evaporates the refrigerant by absorbing heat from the ambient air during the heating operation of the HVAC subsystem 11. In particular, the exterior heat exchanger 35 may be configured to exchange heat with the ambient air forcibly blown by a cooling fan 75 to further increase a heat transfer rate between the exterior heat exchanger 35 and the ambient air.

The water-cooled heat exchanger 70 may be configured to transfer heat among the refrigerant loop 21 of the HVAC subsystem 11, the battery coolant loop 22 of the battery cooling subsystem 12, and the powertrain coolant loop 23 of the powertrain cooling subsystem 13. Specifically, the water-cooled heat exchanger 70 may be disposed between the interior condenser 33 and the exterior heat exchanger 35 in the refrigerant loop 21. The water-cooled heat exchanger 70 may include a first passage 71 fluidly connected to the powertrain coolant loop 23, a second passage 72 fluidly connected to the battery coolant loop 22, and a third passage 73 fluidly connected to the refrigerant loop 21.

During the heating operation of the HVAC subsystem 11, the water-cooled heat exchanger 70 may be configured to evaporate the refrigerant which is received from the interior condenser 33 using heat which is transferred from the powertrain cooling subsystem 13. In other words, during the heating operation of the HVAC subsystem 11, the water-cooled heat exchanger 70 may operate as an evaporator that evaporates the refrigerant by recovering waste heat from the electric motor 51 and the electric/electronic components 52 of the powertrain cooling subsystem 13.

During the cooling operation of the HVAC subsystem 11, the water-cooled heat exchanger 70 may be configured to condense the refrigerant received from the interior condenser 33. The water-cooled heat exchanger 70 may operate as a condenser that condenses the refrigerant by cooling the refrigerant using the battery coolant circulating in the battery coolant loop 22 of the battery cooling subsystem 12 and the powertrain coolant circulating in the powertrain coolant loop 23 of the powertrain cooling subsystem 13.

The heating-side expansion valve 16 may be located on the upstream side of the water-cooled heat exchanger 70 in the refrigerant loop 21. Specifically, the heating-side expansion valve 16 may be disposed between the interior condenser 33 and the water-cooled heat exchanger 70. During the heating operation the HVAC subsystem 11, the heating-side expansion valve 16 may be configured to adjust the flow of the refrigerant or the flow rate of the refrigerant flowing into the water-cooled heat exchanger 70. The heating-side expansion valve 16 may be configured to expand the refrigerant received from the interior condenser 33 during the heating operation the HVAC subsystem 11.

According to an exemplary embodiment, the heating-side expansion valve 16 may be an electronic expansion valve (EXV) having a drive motor 16a. The drive motor 16a may have a shaft which is movable to open or close an orifice defined in a valve body of the heating-side expansion valve 16, and the position of the shaft may be varied depending on the rotation direction, rotation degree, and the like of the drive motor 16a, and thus the opening degree of the heating-side expansion valve 16 with respect to the orifice may be varied. A controller 100 may be configured to execute the operation of the drive motor 16a. The heating-side expansion valve 16 may be a full open type EXV.

The opening degree of the heating-side expansion valve 16 may be varied by the controller 100. As the opening degree of the heating-side expansion valve 16 is varied, the flow rate of the refrigerant directed toward the third passage 73 may be varied. The heating-side expansion valve 16 may be operated by the controller 100 during the heating operation of the HVAC subsystem 11.

The cooling-side expansion valve 15 may be disposed between the exterior heat exchanger 35 and the evaporator 31 in the refrigerant loop 21. As the cooling-side expansion valve 15 is located on the upstream side of the evaporator 31, it may adjust the flow of the refrigerant or the flow rate of the refrigerant flowing into the evaporator 31. During the cooling operation of the HVAC subsystem 11, the cooling-side expansion valve 15 may be configured to expand the refrigerant received from the exterior heat exchanger 35.

According to an exemplary embodiment, the cooling-side expansion valve 15 may be a thermal expansion valve (TXV) which senses the temperature and/or pressure of the refrigerant and adjusts the opening degree of the cooling-side expansion valve 15. Specifically, the cooling-side expansion valve 15 may be a TXV having a shut-off valve 15a selectively blocking the flow of the refrigerant toward an internal passage of the cooling-side expansion valve 15, and the shut-off valve 15a may be a solenoid valve. The shut-off valve 15a may be opened or closed by the controller 100, thereby blocking or unblocking the flow of the refrigerant toward the cooling-side expansion valve 15.

As the shut-off valve 15a is opened, the refrigerant may be allowed to flow into the cooling-side expansion valve 15, and as the shut-off valve 15a is closed, the refrigerant may be blocked from flowing into the cooling-side expansion valve 15. According to an exemplary embodiment, the shut-off valve 15a may be mounted in the inside of a valve body of the cooling-side expansion valve 15, thereby opening or closing the internal passage of the cooling-side expansion valve 15. According to another exemplary embodiment, the shut-off valve 15a may be located on the upstream side of the cooling-side expansion valve 15, thereby selectively opening or closing an inlet of the cooling-side expansion valve 15.

When the shut-off valve 15a is closed, the cooling-side expansion valve 15 may be blocked, and accordingly the refrigerant may only be directed into the battery chiller 37 without flowing into the cooling-side expansion valve 15 and the evaporator 31. In other words, when the shut-off valve 15a of the cooling-side expansion valve 15 is closed, the cooling operation of the HVAC subsystem 11 may not be performed, but only the battery chiller 37 may be cooled or the heating operation of the HVAC subsystem 11 may be performed. When the shut-off valve 15a is opened, the refrigerant may be directed into the cooling-side expansion valve 15 and the evaporator 31. In other words, when the shut-off valve 15a of the cooling-side expansion valve 15 is opened, the cooling operation of the HVAC subsystem 11 may be performed.

The HVAC subsystem 11 may include an HVAC case 30 having an inlet and an outlet, and the HVAC case 30 may be configured to direct the air into the passenger compartment of the vehicle. The evaporator 31 and the interior condenser 33 may be located within the HVAC case 30. An air mixing door 34a may be disposed between the evaporator 31 and the interior condenser 33, and a positive temperature coefficient (PTC) heater 34b may be located on the downstream side of the interior condenser 33.

The HVAC subsystem 11 may further include an accumulator 38 disposed between the evaporator 31 and the compressor 32 in the refrigerant loop 21, and the accumulator 38 may be located on the downstream side of the evaporator 31. The accumulator 38 may be configured to separate a liquid refrigerant from the refrigerant which is received from the evaporator 31, thereby preventing the liquid refrigerant from being directed toward the compressor 32.

The HVAC subsystem 11 may further include a branch conduit 36 branching off from the refrigerant loop 21. The branch conduit 36 may branch off from an upstream point of the cooling-side expansion valve 15 in the refrigerant loop 21 and be connected to the compressor 32. The battery chiller 37 may be fluidly connected to the branch conduit 36, and the battery chiller 37 may be configured to transfer heat between the branch conduit 36 and the battery coolant loop 22 to be described below. In other words, the battery chiller 37 may be configured to transfer heat between the refrigerant circulating in the HVAC subsystem 11 and the battery coolant circulating in the battery cooling subsystem 12.

Specifically, the battery chiller 37 may include a first passage 37a fluidly connected to the branch conduit 36 and a second passage 37b fluidly connected to the battery coolant loop 22. The first passage 37a and the second passage 37b may be adjacent to or contact each other within the battery chiller 37, and the first passage 37a may be fluidly separated from the second passage 37b. Accordingly, the battery chiller 37 may be configured to transfer heat between the battery coolant passing through the second passage 37b and the refrigerant passing through the first passage 37a. The branch conduit 36 may be fluidly connected to the accumulator 38, and the refrigerant passing through the branch conduit 36 may be received in the accumulator 38.

A chiller-side expansion valve 17 may be located on the upstream side of the battery chiller 37 in the branch conduit 36. The chiller-side expansion valve 17 may be configured to adjust the flow of the refrigerant or the flow rate of the refrigerant flowing into the battery chiller 37, and the chiller-side expansion valve 17 may be configured to expand the refrigerant received from the exterior heat exchanger 35.

According to an exemplary embodiment, the chiller-side expansion valve 17 may be an electronic expansion valve (EXV) having a drive motor 17a. The drive motor 17a may have a shaft which is movable to open or close an orifice defined in a valve body of the chiller-side expansion valve 17, and the position of the shaft may be varied depending on the rotation direction, rotation degree, and the like of the drive motor 17a, and accordingly the opening degree of the chiller-side expansion valve 17 may be varied. In other words, the controller 100 may be configured to execute the operation of the drive motor 17a to vary the opening degree of the chiller-side expansion valve 17. The chiller-side expansion valve 17 may be a full open type EXV.

As the opening degree of the chiller-side expansion valve 17 is varied, the flow rate of the refrigerant directed toward the battery chiller 37 may be varied. For example, when the opening degree of the chiller-side expansion valve 17 is greater than a reference opening degree, the flow rate of the refrigerant directed toward the battery chiller 37 may increase compared to a reference flow rate, and when the opening degree of the chiller-side expansion valve 17 is less than the reference opening degree, the flow rate of the refrigerant directed toward the battery chiller 37 may be similar to the reference flow rate or decrease compared to the reference flow rate. In particular, the reference opening degree may be an opening degree of the chiller-side expansion valve 17 for maintaining a target evaporator temperature, and the reference flow rate may be a flow rate of the refrigerant directed toward the battery chiller 37 when the chiller-side expansion valve 17 is opened to the reference opening degree. In other words, when the chiller-side expansion valve 17 is opened to the reference opening degree, the refrigerant may be directed toward the battery chiller 37 at the corresponding reference flow rate.

As the opening degree of the chiller-side expansion valve 17 is adjusted by the controller 100, the flow rate of the refrigerant directed toward the battery chiller 37 may be varied, and accordingly the flow rate of the refrigerant directed toward the evaporator 31 may be varied. As the opening degree of the chiller-side expansion valve 17 is adjusted, the refrigerant may be distributed into the evaporator 31 and the battery chiller 37 at a predetermined rate, and thus the cooling of the HVAC subsystem 11 and the cooling of the battery chiller 37 may be performed simultaneously or selectively.

The HVAC subsystem 11 may further include a refrigerant bypass conduit 39 that connects a downstream point of the water-cooled heat exchanger 70 and the branch conduit 36. An inlet of the refrigerant bypass conduit 39 may be connected to the downstream point of the water-cooled heat exchanger 70, and an outlet of the refrigerant bypass conduit 39 may be connected to the branch conduit 36. Specifically, the inlet of the refrigerant bypass conduit 39 may be connected to a point between the water-cooled heat exchanger 70 and the exterior heat exchanger 35, and the outlet of the refrigerant bypass conduit 39 may be connected to a point between the battery chiller 37 and the compressor 32 in the branch conduit 36. A first three-way valve 61 may be disposed at a junction between the inlet of the refrigerant bypass conduit 39 and the refrigerant loop 21.

The first three-way valve 61 may be disposed between the exterior heat exchanger 35 and the water-cooled heat exchanger 70 in the refrigerant loop 21. When the first three-way valve 61 is switched to open the inlet of the refrigerant bypass conduit 39, the refrigerant passing through the third passage 73 of the water-cooled heat exchanger 70 may be directed toward the compressor 32 through the refrigerant bypass conduit 39. In other words, when the inlet of the refrigerant bypass conduit 39 is opened by the switching of the first three-way valve 61, the refrigerant may bypass the exterior heat exchanger 35. When the first three-way valve 61 is switched to close the inlet of the refrigerant bypass conduit 39, the refrigerant passing through the third passage 73 of the water-cooled heat exchanger 70 may not pass through the refrigerant bypass conduit 39, and be directed toward the exterior heat exchanger 35. In other words, when the inlet of the refrigerant bypass conduit 39 is closed by the switching of the first three-way valve 61, the refrigerant may pass through the exterior heat exchanger 35.

The controller 100 may be configured to execute respective operations of the shut-off valve 15a of the cooling-side expansion valve 15, the heating-side expansion valve 16, the chiller-side expansion valve 17, the compressor 32, and the like so that the overall operation of the HVAC subsystem 11 may be executed by the controller 100. According to an exemplary embodiment, the controller 100 may be a full automatic temperature control (FATC) system.

When the HVAC subsystem 11 operates in cooling mode, the shut-off valve 15a of the cooling-side expansion valve 15 may be opened, and the refrigerant may sequentially circulate through the compressor 32, the interior condenser 33, the heating-side expansion valve 16, the third passage 73 of the water-cooled heat exchanger 70, the exterior heat exchanger 35, the cooling-side expansion valve 15, and the evaporator 31.

When the HVAC subsystem 11 operates in the heating mode, the shut-off valve 15a of the cooling-side expansion valve 15 may be closed, and the refrigerant may sequentially circulate through the compressor 32, the interior condenser 33, the heating-side expansion valve 16, the third passage 73 of the water-cooled heat exchanger 70, the exterior heat exchanger 35, the chiller-side expansion valve 17, the first passage 37a of the battery chiller 37, and the compressor 32. During the heating operation of the HVAC subsystem 11, when the shut-off valve 15a of the cooling-side expansion valve 15 is closed, and the inlet of the refrigerant bypass conduit 39 is opened by the switching of the first three-way valve 61, the refrigerant may sequentially circulate through the compressor 32, the interior condenser 33, the heating-side expansion valve 16, the third passage 73 of the water-cooled heat exchanger 70, the refrigerant bypass conduit 39, and the compressor 32.

The battery cooling subsystem 12 may be configured to cool the battery pack 41 using the battery coolant circulating in the battery coolant loop 22. The battery coolant loop 22 may be fluidly connected to the battery pack 41, a heater 42, the battery chiller 37, a first battery-side pump 44, a battery radiator 43, a reservoir tank 48, and a second battery-side pump 45. In FIG. 1, the battery coolant may sequentially pass through the battery pack 41, the heater 42, the battery chiller 37, the first battery-side pump 44, the battery radiator 43, the reservoir tank 48, the water-cooled heat exchanger 70, and the second battery-side pump 45 through the battery coolant loop 22.

The battery pack 41 may have a coolant passage through which the battery coolant passes inside or outside the battery pack 41, and the battery coolant loop 22 may be fluidly connected to the coolant passage of the battery pack 41. The heater 42 may be disposed between the battery chiller 37 and the battery pack 41, and the heater 42 may be configured to heat the battery coolant circulating through the battery coolant loop 22, thereby warming-up the coolant. According to an exemplary embodiment, the heater 42 may be a water-heating heater that heats the coolant by exchanging heat with a high-temperature fluid. According to another exemplary embodiment, the heater 42 may be an electric heater.

The battery radiator 43 may be disposed adjacent to the front grille of the vehicle, and the battery radiator 43 may be cooled by the ambient air forcibly blown by the cooling fan 75. The battery radiator 43 may be adjacent to the exterior heat exchanger 35. The first battery-side pump 44 may allow the battery coolant to circulate through at least a portion of the battery coolant loop 22, and the second battery-side pump 45 may allow the battery coolant to circulate through at least a portion of the battery coolant loop 22.

The first battery-side pump 44 may be disposed at an upstream point of the battery radiator 43 in the battery coolant loop 22. The first battery-side pump 44 may be configured to forcibly pump the battery coolant into an inlet of the battery radiator 43, thereby allowing the battery coolant to pass through the battery radiator 43. The second battery-side pump 45 may be disposed at an upstream point of the battery pack 41 in the battery coolant loop 22. The second battery-side pump 45 may forcibly pump the battery coolant into the battery pack 41, thereby allowing the battery coolant to pass through the battery pack 41.

The first battery-side pump 44 and the second battery-side pump 45 may be configured to operate individually and selectively according to the heating state and charging condition of the battery pack 41, the operating condition of the HVAC subsystem 11, and the like. The reservoir tank 48 may be disposed between an outlet of the battery radiator 43 and an inlet of the second battery-side pump 45.

The battery cooling subsystem 12 may further include a first battery bypass conduit 46 allowing the battery coolant to bypass the battery radiator 43. The first battery bypass conduit 46 may directly connect the upstream point of the battery radiator 43 and a downstream point of the battery radiator 43 in the battery coolant loop 22.

An inlet of the first battery bypass conduit 46 may be connected to a point between the battery chiller 37 and the inlet of the battery radiator 43 in the battery coolant loop 22. Specifically, the inlet of the first battery bypass conduit 46 may be connected to a point between the battery chiller 37 and an inlet of the first battery-side pump 44 in the battery coolant loop 22.

An outlet of the first battery bypass conduit 46 may be connected to a point between the battery chiller 37 and the outlet of the battery radiator 43 in the battery coolant loop 22. Specifically, the outlet of the first battery bypass conduit 46 may be connected to a point between the inlet of the second battery-side pump 45 and an outlet of the reservoir tank 48 in the battery coolant loop 22.

As the battery coolant flows from an outlet of the battery chiller 37 to the inlet of the second battery-side pump 45 through the first battery bypass conduit 46, the battery coolant may bypass the first battery-side pump 44, the battery radiator 43, the reservoir tank 48, and the water-cooled heat exchanger 70, and accordingly the battery coolant passing through the first battery bypass conduit 46 may sequentially circulate through the battery pack 41, the heater 42, and the battery chiller 37 by the second battery-side pump 45.

The battery cooling subsystem 12 may further include a second battery bypass conduit 47 allowing the battery coolant to bypass the battery pack 41, the heater 42, and the battery chiller 37. The second battery bypass conduit 47 may directly connect a downstream point of the battery chiller 37 and the upstream point of the battery pack 41 in the battery coolant loop 22.

An inlet of the second battery bypass conduit 47 may be connected to a point between the outlet of the first battery bypass conduit 46 and the outlet of the battery radiator 43 in the battery coolant loop 22. Specifically, the inlet of the second battery bypass conduit 47 may be connected to a point between the outlet of the first battery bypass conduit 46 and the outlet of the reservoir tank 48 in the battery coolant loop 22.

An outlet of the second battery bypass conduit 47 may be connected to a point between the inlet of the first battery bypass conduit 46 and the inlet of the battery radiator 43 in the battery coolant loop 22. Specifically, the outlet of the second battery bypass conduit 47 may be connected to a point between the inlet of the first battery bypass conduit 46 and the inlet of the first battery-side pump 44 in the battery coolant loop 22. As the battery coolant flows from the outlet of the battery radiator 43 to the inlet of the first battery-side pump 44 through the second battery bypass conduit 47, the battery coolant may bypass the battery pack 41, the heater 42, and the battery chiller 37, and accordingly the battery coolant passing through the second battery bypass conduit 47 may sequentially circulate through the battery radiator 43, the reservoir tank 48, and the water-cooled heat exchanger 70 by the first battery-side pump 44. The first battery bypass conduit 46 and the second battery bypass conduit 47 may be parallel to each other.

The battery cooling subsystem 12 may further include a second three-way valve 62 disposed at the inlet of the first battery bypass conduit 46. In other words, the second three-way valve 62 may be disposed at a junction between the inlet of the first battery bypass conduit 46 and the battery coolant loop 22. When the second three-way valve 62 is switched to open the inlet of the first battery bypass conduit 46, a portion of the battery coolant (from the battery chiller 37) may pass through the first battery bypass conduit 46 so that it may bypass the battery radiator 43, and the remaining battery coolant (from the battery radiator 43) may pass through the second battery bypass conduit 47 so that it may bypass the battery pack 41, the heater 42, and the battery chiller 37.

In other words, when the inlet of the first battery bypass conduit 46 is opened by the switching of the second three-way valve 62, the second three-way valve 62, the first battery bypass conduit 46, and the second battery bypass conduit 47 separate the battery coolant loop 22 into two independent circulation loops fluidly separated from each other. The battery coolant passing through the first battery bypass conduit 46 may bypass the first battery-side pump 44, the battery radiator 43, the reservoir tank 48, and the water-cooled heat exchanger 70, and sequentially circulate through the battery pack 41, the heater 42, and the battery chiller 37 by the second battery-side pump 45. The battery coolant passing through the second battery bypass conduit 47 may bypass the second battery-side pump 45, the battery pack 41, the heater 42, and the battery chiller 37, and sequentially circulate through the battery radiator 43, the reservoir tank 48, and the water-cooled heat exchanger 70 by the first battery-side pump 44.

When the second three-way valve 62 is switched to close the inlet of the first battery bypass conduit 46, the battery coolant may not pass through the first battery bypass conduit 46. In other words, when the inlet of the first battery bypass conduit 46 is closed by the switching of the second three-way valve 62, the battery coolant may circulate through the battery coolant loop 22.

The battery cooling subsystem 12 may be operated by a battery management system 110. The battery management system 110 may be configured to monitor the state of the battery pack 41, and perform the cooling of the battery pack 41 in response to determining that the temperature of the battery pack 41 is greater than or equal to a predetermined temperature. The battery management system 110 may be configured to transmit an instruction for the cooling of the battery pack 41 to the controller 100, and accordingly the controller 100 may be configured to operate the compressor 32 to be activated and operate the chiller-side expansion valve 17 to open. When the operation of the HVAC subsystem 11 is not required during the cooling operation of the battery pack 41, the controller 100 may be configured to operate the cooling-side expansion valve 15 to close. In addition, the battery management system 110 may be configured to execute the operation of the first battery-side pump 44, the operation of the second battery-side pump 45, and the switching of the second three-way valve 62 as necessary, so that the battery coolant may bypass the battery radiator 43 and circulate through the battery pack 41 and the battery chiller 37.

The powertrain cooling subsystem 13 may be configured to cool the electric motor 51 and the electric/electronic components 52 of the powertrain using the powertrain coolant circulating through the powertrain coolant loop 23. The powertrain coolant loop 23 may be fluidly connected to a powertrain radiator 53, a reservoir tank 56, a powertrain-side pump 54, the electric/electronic components 52, the electric motor 51, and the first passage 71 of the water-cooled heat exchanger 70. In FIG. 1, the powertrain coolant may sequentially pass through the powertrain radiator 53, the reservoir tank 56, the powertrain-side pump 54, the electric/electronic components 52, the electric motor 51, and the first passage 71 of the water-cooled heat exchanger 70 through the powertrain coolant loop 23.

The electric motor 51 may have a coolant passage through which the powertrain coolant passes inside or outside the electric motor 51, and the powertrain coolant loop 23 may be fluidly connected to the coolant passage of the electric motor 51. The electric/electronic components 52 may be one or more electric/electronic components related to the driving of the electric motor 51, such as an inverter, an on-board charger (OBC), and a low DC-DC converter (LDC). The electric/electronic components 52 may have a coolant passage through which the coolant passes inside or outside the electric/electronic components 52, and the powertrain coolant loop 23 may be fluidly connected to the coolant passage of the electric/electronic components 52.

The powertrain radiator 53 may be disposed adjacent to the front grille of the vehicle, and the powertrain radiator 53 may be cooled by the ambient air forcibly blown by the cooling fan 75. The exterior heat exchanger 35, the battery radiator 43, and the powertrain radiator 53 may be disposed adjacent to each other on the front of the vehicle, so that the exterior heat exchanger 35, the battery radiator 43, and the powertrain radiator 53 may contact the ambient air and exchange heat with the ambient air. The cooling fan 75 may be disposed behind the exterior heat exchanger 35, the battery radiator 43, and the powertrain radiator 53.

The powertrain-side pump 54 may be located on the upstream side of the electric motor 51 and the electric/electronic components 52, and the powertrain-side pump 54 may allow the powertrain coolant to circulate in the powertrain coolant loop 23. The powertrain cooling subsystem 13 may further include a powertrain bypass conduit 55 allowing the powertrain coolant to bypass the powertrain radiator 53. The powertrain bypass conduit 55 may directly connect an upstream point of the powertrain radiator 53 and a downstream point of the powertrain radiator 53 in the powertrain coolant loop 23 so that the powertrain coolant from an outlet of the electric motor 51 may be directed toward an inlet of the powertrain-side pump 54 through the powertrain bypass conduit 55, and thus the coolant may bypass the powertrain radiator 53.

An inlet of the powertrain bypass conduit 55 may be connected to a point between the reservoir tank 56 and the electric/electronic components 52 in the powertrain coolant loop 23. Specifically, the inlet of the powertrain bypass conduit 55 may be connected to a point between the reservoir tank 56 and the inlet of the powertrain-side pump 54 in the powertrain coolant loop 23. An outlet of the powertrain bypass conduit 55 may be connected to a point between the electric motor 51 and the powertrain radiator 53 in the powertrain coolant loop 23.

The powertrain cooling subsystem 13 may further include a third three-way valve 63 disposed at the inlet of the powertrain bypass conduit 55. When the third three-way valve 63 is switched to open the inlet of the powertrain bypass conduit 55, the powertrain coolant may pass through the powertrain bypass conduit 55 so that it may bypass the powertrain radiator 53, and thus the powertrain coolant may sequentially circulate through the electric motor 51, the first passage 71 of the water-cooled heat exchanger 70, the powertrain bypass conduit 55, the powertrain-side pump 54, and the electric/electronic components 52. When the third three-way valve 63 is switched to close the inlet of the powertrain bypass conduit 55, the powertrain coolant may not pass through the powertrain bypass conduit 55, and the powertrain coolant may sequentially circulate through the electric motor 51, the first passage 71 of the water-cooled heat exchanger 70, the powertrain radiator 53, the reservoir tank 56, the powertrain-side pump 54, and the electric/electronic components 52.

The reservoir tank 56 may be located on the downstream side of the powertrain radiator 53. In particular, the reservoir tank 56 may be disposed between the powertrain radiator 53 and the third three-way valve 63 in the powertrain coolant loop 23. In the powertrain cooling subsystem 13, the switching of the third three-way valve 63 and the operation of the powertrain-side pump 54 may be operated by the controller 100. Heat rejection from the powertrain components such as the electric motor 51 and the electric/electronic components 52 may relatively increase when the vehicle travels a predetermined distance or the battery is charged rapidly.

The vehicle thermal management system according to an exemplary embodiment of the present disclosure may include an interior temperature sensor 81 configured to measure an interior temperature of the passenger compartment, an exterior temperature sensor or ambient temperature sensor 82 configured to measure an ambient temperature of the vehicle, a solar radiation sensor 83 configured to measure a solar radiation quantity transferred to the vehicle, a first coolant temperature sensor 84 configured to measure a temperature of the powertrain coolant, and a second coolant temperature sensor 85 configured to measure a temperature of the battery coolant.

The interior temperature sensor 81 may be disposed in the passenger compartment to measure the interior temperature in real time. The interior temperature measured by the interior temperature sensor 81 may be used for optimal control of the HVAC subsystem 11. The ambient temperature sensor 81 may be disposed adjacent to the front grille of the vehicle to measure the ambient temperature of the vehicle, and the ambient temperature measured by the ambient temperature sensor 82 may be used for optimal control of the HVAC subsystem 11.

The solar radiation sensor 83 may be disposed on a front windshield or a roof of the vehicle to measure the solar radiation quantity transferred to the vehicle. The solar radiation quantity measured by the solar radiation sensor 83 may be used for optimal control of the HVAC subsystem 11. The first coolant temperature sensor 84 may be disposed on the downstream side of the powertrain components 51 and 52 along the flow direction of the powertrain coolant in the powertrain coolant loop 23. Specifically, the first coolant temperature sensor 84 may be disposed between the powertrain components 51 and 52 and the first passage 71 of the water-cooled heat exchanger 70 in the powertrain coolant loop 23. The first coolant temperature sensor 84 may be configured to measure the temperature of the powertrain coolant that has exchanged heat with the powertrain components 51 and 52. In other words, the first coolant temperature sensor 84 may be configured to measure the temperature of the powertrain coolant that has absorbed heat from the powertrain components 51 and 52.

The second coolant temperature sensor 85 may be disposed on the downstream side of the battery radiator 43 along the flow direction of the battery coolant in the battery coolant loop 22. Specifically, the second coolant temperature sensor 85 may be disposed between the battery radiator 43 and the second passage 72 of the water-cooled heat exchanger 70 in the battery coolant loop 22. The second coolant temperature sensor 85 may be configured to measure the temperature of the battery coolant that has exchanged heat with the battery radiator 43. In other words, the second coolant temperature sensor 85 may be configured to measure the temperature of the battery coolant that has absorbed heat from the ambient air.

The controller 100 may be configured to execute the operations of the HVAC subsystem 11, the battery cooling subsystem 12, and the powertrain cooling subsystem 13 using the interior temperature sensor 81, the ambient temperature sensor 82, the solar radiation sensor 83, the first coolant temperature sensor 84, the second coolant temperature sensor 85, a humidity sensor, a high-pressure side pressure sensor, a low-pressure side pressure sensor, an evaporator temperature sensor, and the like.

Figure 2:
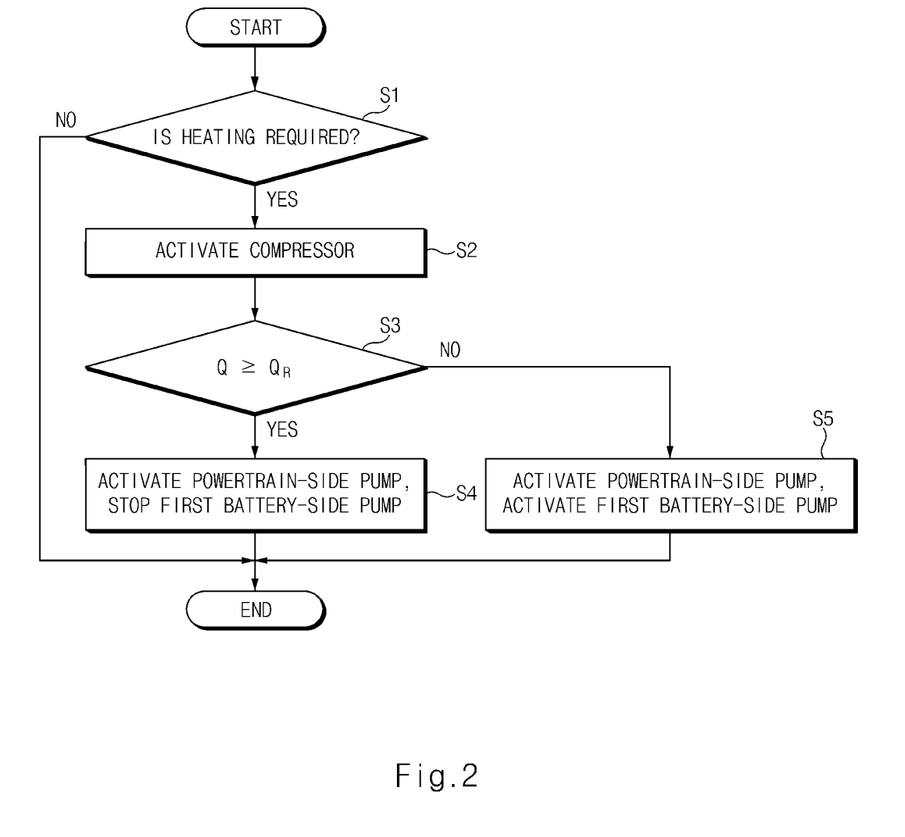
FIG. 2 illustrates a flowchart of a method for controlling heating of a vehicle thermal management system according to an exemplary embodiment of the present disclosure.
Figure 3:
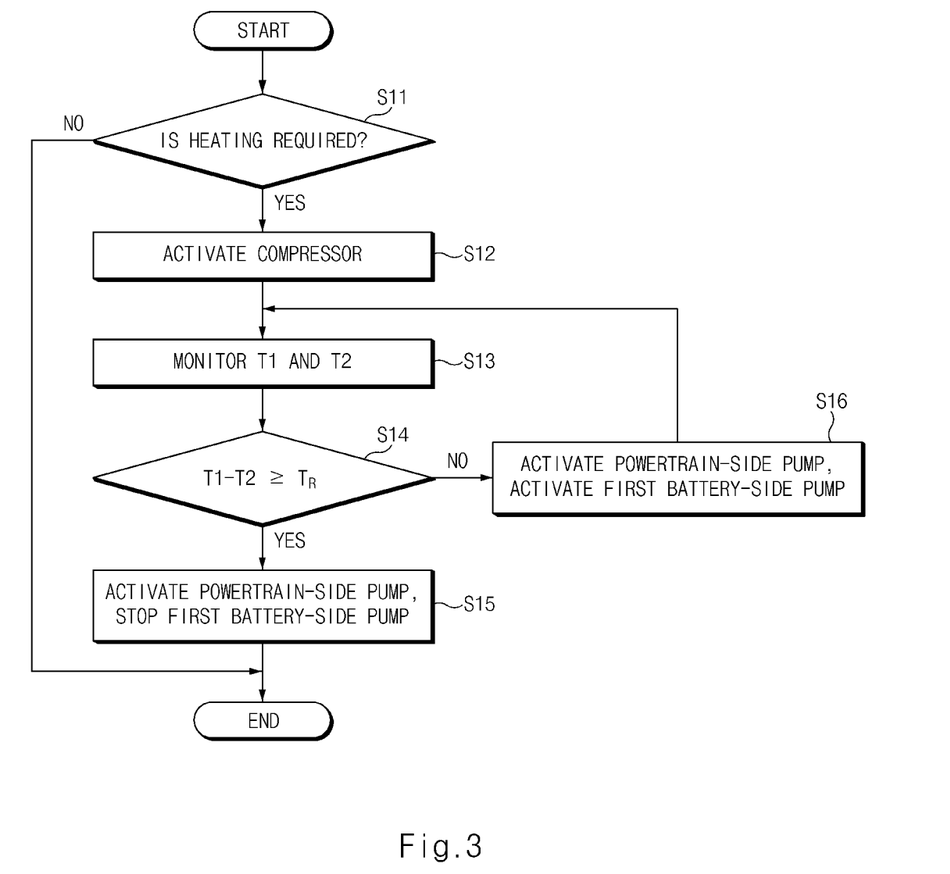
FIG. 3 illustrates a flowchart of a method for controlling heating of a vehicle thermal management system according to another exemplary embodiment of the present disclosure.
Figure 4:
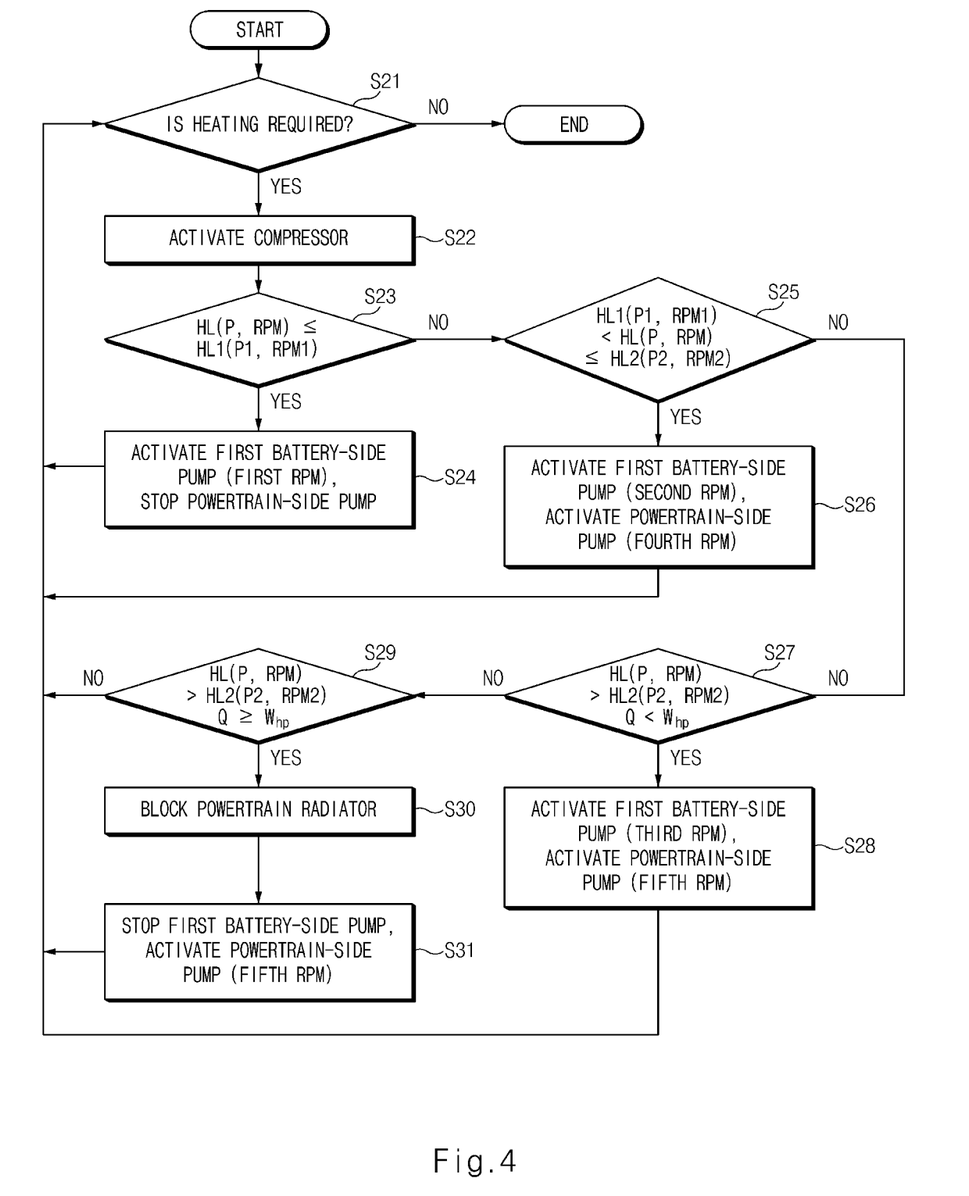
FIG. 4 illustrates a flowchart of a method for controlling heating of a vehicle thermal management system according to another exemplary embodiment of the present disclosure.

FIGS. 2 to 4 illustrate a method for controlling heating of a vehicle thermal management system according to exemplary embodiments of the present disclosure.

According to the exemplary embodiments illustrated in FIGS. 2 and 3, the heating operation of the HVAC subsystem 11 may be executed by allowing a refrigerant circulating in the HVAC subsystem 11 to absorb heat from the ambient air and/or waste heat from the powertrain components 51 and 52 based on heat rejection Q from the powertrain components 51 and 52.

According to the exemplary embodiment illustrated in FIG. 4, the heating operation of the HVAC subsystem 11 may be executed by allowing a refrigerant circulating in the HVAC subsystem 11 to absorb heat from the powertrain components 51 and 52 and/or the ambient air based on a heat load of the HVAC subsystem 11.

FIG. 2 illustrates a flowchart of a method for controlling heating of a vehicle thermal management system according to an exemplary embodiment of the present disclosure. The controller 100 may be configured to determine whether heating of the passenger compartment is required (S1). The controller 100 may be configured to determine that the heating of the passenger compartment is required, based on an ambient air temperature measured by the ambient temperature sensor 82, an interior temperature measured by the interior temperature sensor 81, a desired heating temperature set by a user (an occupant), a temperature of the air (which has passed over the evaporator) measured by the evaporator temperature sensor, and the like. For example, the controller 100 may be configured to determine that the heating of the passenger compartment is required in response to determining that the ambient air temperature is less than a predetermined reference ambient air temperature.

As another example, the controller 100 may be configured to determine that the heating of the passenger compartment is required when the interior temperature is lower than the ambient air temperature. As another example, the controller 100 may be configured to determine that the heating of the passenger compartment is required in response to determining that an interior setting temperature is greater than the interior temperature. As another example, the controller 100 may be configured to determine that the heating of the passenger compartment is required in response to determining that the temperature of the air having passed over the evaporator is less than a reference air temperature. In response to determining that the heating of the passenger compartment is required, the controller 100 may be configured to activate the compressor 32 (S2). The RPM of the compressor 32 may be determined according to interior temperature settings, etc., and may be varied over time.

The controller 100 may be configured to determine whether the heat rejection Q from the powertrain components 51 and 52 is greater than or equal to a reference heat rejection $Q_R$ (S3). The reference heat rejection $Q_R$ may be defined as heat rejection causing the refrigerant circulating in the HVAC subsystem 11 to evaporate by absorbing the heat rejection Q from the powertrain components 51 and 52. For example, when the vehicle is travelling a predetermined distance for a predetermined period of time or rapid charging is performed, the heat rejection Q may increase above the reference heat rejection $Q_R$, and when the vehicle is initially started, the heat rejection Q may be less than the reference heat rejection $Q_R$.

In response to determining that the heat rejection Q from the powertrain components is greater than or equal to the reference heat rejection $Q_R$, the controller 100 may be configured to activate the powertrain-side pump 54 and stop the first battery-side pump 44 (S4), thereby blocking the battery coolant from passing through the battery radiator 43, and accordingly the battery coolant may be prevented from exchanging heat with the ambient air through the battery radiator 43. Thus, the refrigerant passing through the third passage 73 of the water-cooled heat exchanger 70 may only exchange heat with the powertrain coolant passing through the first passage 71 of the water-cooled heat exchanger 70, without exchanging heat with the battery coolant. The powertrain coolant passing through the first passage 71 of the water-cooled heat exchanger 70 may be heated by heat generated from the powertrain components. In the water-cooled heat exchanger 70, the refrigerant may exchange heat with the heated powertrain coolant and absorb heat from the powertrain components (waste heat recovery) so that it may be sufficiently heated and evaporate, which may satisfy the heat load of the HVAC subsystem 11.

In other words, when the heat rejection Q is greater than or equal to the reference heat rejection $Q_R$, the low-temperature refrigerant passing through the third passage 73 of the water-cooled heat exchanger 70 may absorb heat from the powertrain components 51 and 52 so that it may be sufficiently heated and evaporate. When the temperature of the ambient air is less than or equal to the temperature of the refrigerant heated by the water-cooled heat exchanger 70, the refrigerant may be cooled by the battery coolant which has exchanged heat with the ambient air through the battery radiator 43. To prevent the battery coolant from exchanging heat with the ambient air through the battery radiator 43, the operation of the first battery-side pump 44 may be stopped. As the powertrain-side pump 54 is activated, the powertrain coolant may circulate normally through the powertrain coolant loop 23.

In response to determining that the heat rejection Q from the powertrain components 51 and 52 is less than the reference heat rejection $Q_R$, the controller 100 may be configured to activate the powertrain-side pump 54 and the first battery-side pump 44 (S5), thereby allowing the powertrain coolant to pass through the powertrain radiator 53 and allowing the battery coolant to pass through the battery radiator 43. By exchanging heat with the powertrain coolant passing through the first passage 71 of the water-cooled heat exchanger 70 and the battery coolant passing through the second passage 72 of the water-cooled heat exchanger 70, the low-temperature refrigerant passing through the third passage 73 of the water-cooled heat exchanger 70 may evaporate.

Particularly, the powertrain coolant may absorb heat from the ambient air through the powertrain radiator 53 and absorb heat from the powertrain components 51 and 52, and the battery coolant may absorb heat from the ambient air through the battery radiator 43. In other words, when the heat rejection Q is less than the reference heat rejection $Q_R$, the refrigerant circulating in the HVAC subsystem 11 may evaporate in the water-cooled heat exchanger 70 by recovering waste heat from the powertrain components 51 and 52 and absorbing heat from the ambient air.

According to an alternative exemplary embodiment, after the compressor 32 is activated (that is, after S12) or when the heat rejection Q is greater than or equal to the reference heat rejection $Q_R$ in S3, the inlet of the powertrain bypass conduit 55 may be opened by the switching of the third three-way valve 63 so that the powertrain coolant may bypass the powertrain radiator 53, and thus the powertrain coolant may be prevented from exchanging heat with the ambient air through the powertrain radiator 53. This is because when the ambient air temperature is relatively too low, the powertrain coolant having exchanged heat with the ambient air may interfere with the evaporation of the low-temperature refrigerant passing through the third passage 73 of the water-cooled heat exchanger 70.

FIG. 3 illustrates a flowchart of a method for controlling heating of a vehicle thermal management system that specifically implements the embodiment of FIG. 2. Referring to FIG. 3, the controller 100 may be configured to determine whether heating of the passenger compartment is required (S11). In response to determining that the heating of the passenger compartment is required, the controller 100 may be configured to activate the compressor 32 (S12). The controller 100 may be configured to monitor a temperature T1 of the powertrain coolant measured by the first coolant temperature sensor 84 and a temperature T2 of the battery coolant measured by the second coolant temperature sensor 85 (S13).

The controller 100 may be configured to calculate a temperature difference value (T1−T2) between the temperature T1 of the powertrain coolant and the temperature T2 of the battery coolant, and determine whether the temperature difference value (T1−T2) is greater than or equal to a reference value $T_R$ (S14). The reference value $T_R$ may correspond to the reference heat rejection $Q_R$. In response to determining that the temperature difference value (T1−T2) between the temperature T1 of the powertrain coolant and the temperature T2 of the battery coolant is greater than or equal to the reference value $T_R$, the controller 100 may be configured to determine that the heat rejection Q from the powertrain components 51 and 52 is relatively high, and in response to determining that the temperature difference value (T1−T2) between the temperature T1 of the powertrain coolant and the temperature T2 of the battery coolant is less than the reference value $T_R$, the controller 100 may be configured to determine that the heat rejection Q from the powertrain components 51 and 52 is relatively low.

In response to determining that the temperature difference value (T1−T2) between the temperature T1 of the powertrain coolant and the temperature T2 of the battery coolant is greater than or equal to the reference value $T_R$, the controller 100 may be configured to determine that the heat rejection Q from the powertrain components 51 and 52 is greater than or equal to the reference heat rejection $Q_R$. The controller 100 may be configured to activate the powertrain-side pump 54 and stop the first battery-side pump 44 (S15), thereby blocking the battery coolant from passing through the battery radiator 43, and accordingly the battery coolant may be prevented from exchanging heat with the ambient air through the battery radiator 43. The low-temperature refrigerant passing through the third passage 73 of the water-cooled heat exchanger 70 may only exchange heat with the powertrain coolant passing through the first passage 71 of the water-cooled heat exchanger 70, without exchanging heat with the battery coolant.

The powertrain coolant passing through the first passage 71 of the water-cooled heat exchanger 70 may be heated by the heat rejection from the powertrain components. In the water-cooled heat exchanger 70, the low-temperature refrigerant may exchange heat with the heated powertrain coolant and absorb heat from the powertrain components (waste heat recovery) so that it may be sufficiently heated and evaporate, which may satisfy the heat load of the HVAC subsystem 11. In other words, when the temperature difference value (T1−T2) between the temperature T1 of the powertrain coolant and the temperature T2 of the battery coolant is greater than or equal to the reference value $T_R$, the refrigerant circulating in the HVAC subsystem 11 may evaporate sufficiently in the water-cooled heat exchanger 70 by recovering waste heat from the powertrain components.

When the temperature difference value (T1−T2) between the temperature T1 of the powertrain coolant and the temperature T2 of the battery coolant is less than the reference value $T_R$, the controller 100 may be configured to determine that the heat rejection Q from the powertrain components 51 and 52 is less than the reference heat rejection $Q_R$. The controller 100 may be configured to activate the powertrain-side pump 54 and the first battery-side pump 44 (S16), thereby allowing the powertrain coolant to pass through the powertrain radiator 53 and allowing the battery coolant to pass through the battery radiator 43. The low-temperature refrigerant passing through the third passage 73 of the water-cooled heat exchanger 70 may exchange heat with the powertrain coolant passing through the first passage 71 of the water-cooled heat exchanger 70 and exchange heat with the battery coolant passing through the second passage 72 of the water-cooled heat exchanger 70.

The powertrain coolant may absorb heat from the ambient air through the powertrain radiator 53 and absorb heat from the powertrain components 51 and 52, and the battery coolant may absorb heat from the ambient air through the battery radiator 43. In other words, when the temperature difference value (T1−T2) between the temperature T1 of the powertrain coolant and the temperature T2 of the battery coolant is less than the reference value $T_R$, the refrigerant circulating in the HVAC subsystem 11 may evaporate sufficiently in the water-cooled heat exchanger 70 by recovering waste heat from the powertrain components and absorbing heat from the ambient air. After S16, the method may return to S13.

After the powertrain-side pump 54 and the first battery-side pump 44 are activated, the cooling fan 75 may be activated or the active air flap 88 may be opened to absorb more heat from the ambient air. However, when the temperature of the ambient air is low, the cooling fan 75 may be stopped or the active air flap 88 may be closed.

According to an alternative exemplary embodiment, after the compressor 32 is activated (that is, after S12) or when the temperature difference value (T1−T2) is greater than or equal to the reference value $T_R$ in S14, the inlet of the powertrain bypass conduit 55 may be opened by the switching of the third three-way valve 63 so that the powertrain coolant may bypass the powertrain radiator 53, and thus the powertrain coolant may be prevented from exchanging heat with the ambient air through the powertrain radiator 53. This is because when the ambient air temperature is relatively too low, the powertrain coolant having exchanged heat with the ambient air may interfere with the evaporation of the low-temperature refrigerant passing through the third passage 73 of the water-cooled heat exchanger 70.

FIG. 4 illustrates a flowchart of a method for controlling heating of a vehicle thermal management system according to another exemplary embodiment of the present disclosure.

The controller 100 may be configured to determine whether heating of the passenger compartment is required (S21). In response to determining that the heating of the passenger compartment is required, the controller 100 may be configured to activate the compressor 32 (S22). According to an exemplary embodiment, after the compressor 32 is activated, the controller 100 may be configured to operate the third three-way valve 63 to close the inlet of the powertrain bypass conduit 55 so that the powertrain coolant may pass through the powertrain radiator 53 and the powertrain components 51 and 52 by the powertrain-side pump 54.

The controller 100 may be configured to determine whether a heat load HL required for the heating operation of the HVAC subsystem 11 is lower than or equal to a first reference load HL1 (S23). The first reference load HL1 may be a reference load for determining whether the heat load is a low load, and may be varied depending on the driving condition and interior and exterior conditions of the vehicle, the heating operation condition of the HVAC subsystem 11, the specification of the vehicle, and the like.

When the heat load HL is lower than or equal to the first reference load HL1, the controller 100 may be configured to determine that the heating operation condition of the HVAC subsystem 11 meets a low load condition. When the heating operation condition of the HVAC subsystem 11 meets the low load condition, the heat rejection Q from the powertrain components 51 and 52 may be relatively low. Even when the refrigerant circulating in the HVAC subsystem 11 absorbs heat from the powertrain components 51 and 52, the heat capacity of the HVAC subsystem 11 may be relatively low, so there is no heat gain in the HVAC subsystem 11.

When the heat load HL is lower than or equal to the first reference load HL1, the controller 100 may be configured to stop the powertrain-side pump 54 and activate only the first battery-side pump 44 (S24) so that the refrigerant circulating in the HVAC subsystem 11 may exchange heat with the battery coolant having absorbed heat from the ambient air. As the first battery-side pump 44 is activated, the battery coolant may pass through the battery radiator 43 so that the battery coolant may absorb heat from the ambient air through the battery radiator 43, and thus the low-temperature refrigerant passing through the third passage 73 of the water-cooled heat exchanger 70 may be heated and evaporate by the battery coolant having absorbed heat from the ambient air. As the powertrain-side pump 54 is stopped, the powertrain coolant may not circulate through the powertrain coolant loop 23, and the low-temperature refrigerant passing through the third passage 73 of the water-cooled heat exchanger 70 may not exchange heat with the powertrain coolant. In particular, the first battery-side pump 44 may operate at a relatively low RPM which is set based on the heat load, i.e., low load of the HVAC subsystem 11.

On the contrary, if the controller 100 stops the first battery-side pump 44 and activates only the powertrain-side pump 54 in S24, the refrigerant may exchange heat with the powertrain coolant in the water-cooled heat exchanger 70. In particular, however, the flow rate of the powertrain coolant circulated by the powertrain-side pump 54 is lower than the flow rate of the battery coolant circulated by the first battery-side pump 44 because the powertrain coolant loop 23 has a relatively complicated flow path. If the first battery-side pump 44 is stopped and only the powertrain-side pump 54 is activated in S24, the flow rate of the powertrain coolant may be relatively low, and thus the heat exchange performance of the refrigerant in the water-cooled heat exchanger 70 may be relatively reduced. By taking this into consideration, only the first battery-side pump 44 may be activated in S24, and thus the heat exchange performance of the refrigerant may be improved and power consumption may be reduced.

When the heat load HL is higher than the first reference load HL1 in S23, the controller 100 may be configured to determine whether the heat load HL is higher than the first reference load HL1 and is lower than or equal to a second reference load HL2 (S25). The second reference load HL2 is a reference load for determining whether the heat load is a medium load, and the second reference load HL2 may be higher than the first reference load HILL The second reference load HL2 may be varied depending on the driving condition and interior and exterior conditions of the vehicle, the heating operation condition of the HVAC subsystem 11, the specification of the vehicle, and the like.

When the heat load HL is higher than the first reference load HL1 and is lower than or equal to the second reference load HL2, the controller 100 may be configured to determine that the heating operation condition of the HVAC subsystem 11 meets a medium load condition. When the heating operation condition of the HVAC subsystem 11 meets the medium load condition, the heat rejection Q from the powertrain components 51 and 52 may relatively increase, compared to the low load condition.

When the heat load HL is higher than the first reference load HL1 and is lower than or equal to the second reference load HL2, the controller 100 may be configured to activate the first battery-side pump 44 and the powertrain-side pump 54 (S26) so that the refrigerant circulating in the HVAC subsystem 11 may exchange heat with the battery coolant having absorbed heat from the ambient air, and exchange heat with the powertrain coolant having absorbed heat from the powertrain components 51 and 52 and the ambient air. As the first battery-side pump 44 is activated, the battery coolant may pass through the battery radiator 43 so that the battery coolant may absorb heat from the ambient air through the battery radiator 43, and thus the low-temperature refrigerant passing through the third passage 73 of the water-cooled heat exchanger 70 may be heated and evaporate by the battery coolant having absorbed heat from the ambient air.

As the powertrain-side pump 54 is activated, the powertrain coolant may pass through the powertrain components 51 and 52 and the powertrain radiator 53 so that the powertrain coolant may absorb heat from the powertrain components 51 and 52 and absorb heat from the ambient air through the powertrain radiator 53, and thus the low-temperature refrigerant passing through the third passage 73 of the water-cooled heat exchanger 70 may be heated and evaporate by the powertrain coolant having absorbed heat from the powertrain components 51 and 52 and the ambient air. In particular, the first battery-side pump 44 and the powertrain-side pump 54 may operate at a relatively medium RPM which is set based on the heat load, i.e., medium load of the HVAC subsystem 11.

In response to determining in S25 that the heat load HL is higher than the second reference load HL2, the controller 100 may be configured to determine whether the heat load HL exceeds the second reference load HL2 and the heat rejection Q from the powertrain components 51 and 52 is less than a heat capacity $W_{hp}$ generated by the heating operation of the HVAC subsystem 11 (S27). The heat rejection Q may be calculated using the first coolant temperature sensor 84 and a flow sensor mounted on the powertrain coolant loop 23, and the heat capacity $W_{hp}$ may be calculated using the coefficient of performance (COP) of the HVAC subsystem 11, power consumption of the compressor 32, etc.

When the heat load HL exceeds the second reference load HL2 and the heat rejection Q is less than the heat capacity $W_{hp}$, the controller 100 may be configured to determine that the heating operation condition of the HVAC subsystem 11 meets a high load condition, and the heat rejection Q of the powertrain components 51 and 52 alone is not sufficient to cause the refrigerant circulating in the HVAC subsystem 11 to evaporate.

When the heat load HL exceeds the second reference load HL2 and the heat rejection Q is less than the heat capacity $W_{hp}$, the controller 100 may be configured to activate the first battery-side pump 44 and the powertrain-side pump 54 (S28) so that the refrigerant circulating in the HVAC subsystem 11 may exchange heat with the battery coolant having absorbed heat from the ambient air, and exchange heat with the powertrain coolant having absorbed heat from the powertrain components 51 and 52 and the ambient air. As the first battery-side pump 44 is activated, the battery coolant may pass through the battery radiator 43 so that the battery coolant may absorb heat from the ambient air through the battery radiator 43, and thus the low-temperature refrigerant passing through the third passage 73 of the water-cooled heat exchanger 70 may be heated and evaporate by the battery coolant having absorbed heat from the ambient air.

As the powertrain-side pump 54 is activated, the powertrain coolant may pass through the powertrain components 51 and 52 and the powertrain radiator 53 so that the powertrain coolant may absorb heat from the powertrain components 51 and 52 and absorb heat from the ambient air through the powertrain radiator 53, and thus the low-temperature refrigerant passing through the third passage 73 of the water-cooled heat exchanger 70 may be heated and evaporate by the powertrain coolant having absorbed heat from the powertrain components 51 and 52 and the ambient air. In particular, the first battery-side pump 44 and the powertrain-side pump 54 may operate at a relatively high RPM (the highest RPM) which is set based on the heat load, i.e., high load of the HVAC subsystem 11.

The controller may be configured to determine whether the heat load HL exceeds the second reference load HL2 and the heat rejection Q from the powertrain components 51 and 52 is greater than or equal to the heat capacity $W_{hp}$ generated by the heating operation of the HVAC subsystem 11 (S29). When the heat load HL exceeds the second reference load HL2 and the heat rejection Q is greater than or equal to the heat capacity $W_{hp}$, the controller 100 may be configured to determine that the heating operation condition of the HVAC subsystem 11 meets a high load condition, and the heat rejection Q of the powertrain components 51 and 52 is sufficient to cause the refrigerant circulating in the HVAC subsystem 11 to evaporate.

When the heat load HL exceeds the second reference load HL2 and the heat rejection Q is greater than or equal to the heat capacity $W_{hp}$, the controller 100 may be configured to execute the switching of the third three-way valve 63 to open the inlet of the powertrain bypass conduit 55. When the inlet of the powertrain bypass conduit 55 is opened by the switching of the third three-way valve 63, the powertrain coolant may pass through the powertrain bypass conduit 55 and bypass the powertrain radiator 53, and accordingly the powertrain coolant may not absorb heat from the ambient air through the powertrain radiator 53. In other words, as the inlet of the powertrain bypass conduit 55 is opened by the switching of the third three-way valve 63, the powertrain coolant may be blocked from being directed toward the powertrain radiator 53 (S30), and the powertrain coolant may pass through the powertrain components 51 and 52.

The controller 100 may be configured to stop the first battery-side pump 44 and activate the powertrain-side pump 54 (S31) so that the refrigerant circulating in the HVAC subsystem 11 may pass through only the powertrain components 51 and 52, and thus the powertrain coolant may only absorb heat from the powertrain components 51 and 52, and the refrigerant circulating in the HVAC subsystem 11 may only exchange heat with the powertrain coolant having absorbed heat from the powertrain components 51 and 52. The powertrain coolant may circulate through the powertrain components 51 and 52 and the first passage 71 of the water-cooled heat exchanger 70, and the refrigerant circulating in the HVAC subsystem 11 may be heated and evaporate by only the powertrain coolant having absorbed heat from the powertrain components 51 and 52. Here, the powertrain-side pump 54 may operate at a relatively high RPM (the highest RPM) which is set based on the heat load, i.e., high load of the HVAC subsystem 11.

The first battery-side pump 44 may operate at a first RPM which is set relatively low based on the low load condition when the heating operation condition of the HVAC subsystem 11 meets the low load condition, operate at a second RPM which is set to medium based on the medium load condition when the heating operation condition of the HVAC subsystem 11 meets the medium load condition, and operate at a third RPM which is set relatively high based on the high load condition when the heating operation condition of the HVAC subsystem 11 meets the high load condition. The second RPM may be greater than the first RPM, and the third RPM may be greater than the second RPM. In other words, the RPM of the first battery-side pump 44 may increase in proportion to the heat load.

The powertrain-side pump 54 may not operate when the heating operation condition of the HVAC subsystem 11 meets the low load condition, operate at a fourth RPM which is set to medium based on the medium load condition when the heating operation condition of the HVAC subsystem 11 meets the medium load condition, and operate at a fifth RPM which is set high based on the high load condition when the heating operation condition of the HVAC subsystem 11 meets the high load condition. The fifth RPM may be greater than the fourth RPM. In other words, the RPM of the powertrain-side pump 54 may increase in proportion to the heat load.

According to an exemplary embodiment, the heat load HL may be defined by the pressure of the refrigerant discharged from the outlet of the compressor 32, that is, a discharge pressure P of the compressor 32. The first reference load HL1 may be defined as a first reference pressure P1, and the second reference load HL2 may be defined as a second reference pressure P2. When the discharge pressure P of the compressor 32 is less than or equal to the first reference pressure P1, the controller 100 may be configured to determine that the heating operation condition of the HVAC subsystem 11 meets the low load condition. When the discharge pressure P of the compressor 32 exceeds the first reference pressure P1 and is less than or equal to the second reference pressure P2, the controller 100 may be configured to determine that the heating operation condition of the HVAC subsystem 11 meets the medium load condition. When the discharge pressure P of the compressor 32 exceeds the second reference pressure P2, the controller 100 may be configured to determine that the heating operation condition of the HVAC subsystem 11 meets the high load condition.

According to another exemplary embodiment, the heat load HL may be defined by the RPM of the compressor 32. The first reference load HL1 may be defined as a first RPM RPM1, and the second reference load HL2 may be defined as a second RPM RPM2. When the RPM of the compressor 32 is less than or equal to the first RPM RPM1, the controller 100 may be configured to determine that the heating operation condition of the HVAC subsystem 11 meets the low load condition. When the RPM of the compressor 32 exceeds the first RPM RPM1 and is less than or equal to the second RPM RPM2, the controller 100 may be configured to determine that the heating operation condition of the HVAC subsystem 11 meets the medium load condition. When the RPM of the compressor 32 exceeds the second RPM RPM2, the controller 100 may be configured to determine that the heating operation condition of the HVAC subsystem 11 meets the high load condition.

As set forth above, the vehicle thermal management system according to exemplary embodiments of the present disclosure may allow the refrigerant circulating in the HVAC subsystem to selectively recover heat from the ambient air and/or waste heat from the electric/electronic components according to the driving conditions, charging conditions of the vehicle, the heating operation conditions of the HVAC subsystem, and the like during the heating operation of the HVAC subsystem, thereby achieving evaporation performance of the refrigerant, and thus the desired heating performance of the HVAC subsystem may be satisfied.

According to exemplary embodiments of the present disclosure, when the heat rejection from the powertrain components (the electric motor, the electric/electronic components, etc.) is relatively high, the refrigerant circulating in the HVAC subsystem may absorb heat from the powertrain components so that the desired heating performance of the HVAC subsystem may be satisfied, and when the heat rejection from the powertrain components is relatively low, the refrigerant circulating in the HVAC subsystem may absorb heat from the powertrain components and the ambient air so that the desired heating performance of the HVAC subsystem may be satisfied.

According to exemplary embodiments of the present disclosure, when the heat load required for the heating operation of the HVAC subsystem is a medium load or a high load, the refrigerant circulating in the HVAC subsystem may absorb heat from the powertrain components and/or the ambient air so that the desired heating performance of the HVAC subsystem may be satisfied, and when the heat load required for the heating operation of the HVAC subsystem is a low load, the refrigerant circulating in the HVAC subsystem may absorb heat from the ambient air so that the desired heating performance of the HVAC subsystem may be satisfied.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for controlling heating of a vehicle thermal management system including a heating, ventilation, and air conditioning (HVAC) subsystem, the method comprising:

activating, by a controller, a compressor of the HVAC subsystem in response to determining that heating of a passenger compartment is required;

determining, by the controller, whether a heat rejection from a powertrain component is greater than or equal to a reference heat rejection; and activating, by the controller, a powertrain-side pump and stopping a battery-side pump in response to determining that the heat rejection is greater than or equal to the reference heat rejection, wherein a refrigerant circulating in the HVAC subsystem exchanges heat with a powertrain coolant having absorbed heat from the powertrain component;

wherein the refrigerant circulating in the HVAC subsystem further exchanges heat with a battery coolant having absorbed heat from ambient air while exchanging heat with the powertrain coolant having absorbed heat from the powertrain component;

monitoring, by the controller, a temperature of the powertrain coolant having absorbed heat from the powertrain component and the temperature of a battery coolant having absorbed heat from the ambient air;

calculating, by the controller, a temperature difference value between the temperature of the powertrain coolant and the temperature of the battery coolant; and determining, by the controller, whether the temperature difference value is greater than or equal to a reference value, wherein the controller is configured to determine that the heat rejection is greater than or equal to the reference heat rejection in response to determining that the temperature difference value is greater than or equal to the reference value, and wherein the controller is configured to determine that the heat rejection is less than the reference heat rejection in response to determining that the temperature difference value is less than the reference value.

2. The method according to claim 1, further comprising activating, by the controller, the powertrain-side pump and the battery-side pump in response to determining that the heat rejection is less than the reference heat rejection.

3. The method according to claim 2, wherein the battery-side pump is configured to allow the battery coolant to pass through a battery radiator, the battery radiator is configured to contact the ambient air, and the powertrain-side pump is configured to allow the powertrain coolant to pass through the powertrain component.

4. The method according to claim 3, wherein the temperature of the powertrain coolant is measured by a first coolant temperature sensor which is disposed on the downstream side of the powertrain component along a flow direction of the powertrain coolant, and the temperature of the battery coolant is measured by a second coolant temperature sensor which is disposed on the downstream side of the battery radiator along a flow direction of the battery coolant.

5. A method for controlling heating of a vehicle thermal management system including a heating, ventilation, and air conditioning (HVAC) subsystem, the method comprising:

activating, by a controller, a compressor of the HVAC subsystem in response to determining that heating of a passenger compartment is required;

determining, by the controller, whether a heat load required for a heating operation of the HVAC subsystem is lower than or equal to a first reference load; and activating, by the controller, a battery-side pump and stopping a powertrain-side pump in response to determining that the heat load is lower than or equal to the first reference load;

wherein a refrigerant circulating in the HVAC subsystem exchanges heat with a battery coolant having absorbed heat from ambient air, and wherein the battery-side pump operates at a first RPM;

determining, by the controller, whether the heat load exceeds the first reference load and is lower than or equal to a second reference load; and activating, by the controller, the powertrain-side pump and the battery-side pump in response to determining that the heat load exceeds the first reference load and is lower than or equal to the second reference load;

wherein the second reference load is higher than the first reference load;

wherein the refrigerant circulating in the HVAC subsystem exchanges heat with a powertrain coolant having absorbed heat from a powertrain component and the ambient air while exchanging heat with the battery coolant having absorbed heat from the ambient air;

wherein the battery-side pump operates at a second RPM greater than the first RPM; and wherein the powertrain-side pump operates at a fourth RPM.

6. The method according to claim 5, further comprising:

determining, by the controller, whether the heat load exceeds the second reference load and a heat rejection from the powertrain component is less than a heat capacity generated by the heating operation of the HVAC subsystem; and activating, by the controller, the powertrain-side pump and the battery-side pump in response to determining that the heat load exceeds the second reference load and the heat rejection is less than the heat capacity, wherein the refrigerant circulating in the HVAC subsystem exchanges heat with the powertrain coolant having absorbed heat from the powertrain component and the ambient air while exchanging heat with the battery coolant having absorbed heat from the ambient air, wherein the battery-side pump operates at a third RPM greater than the second RPM, and wherein the powertrain-side pump operates at a fifth RPM greater than the fourth RPM.

7. The method according to claim 6, further comprising:

blocking the powertrain coolant from passing through a powertrain radiator and allowing the powertrain coolant to pass through the powertrain component in response to determining that the heat load exceeds the second reference load and the heat rejection is greater than or equal to the heat capacity; and activating, by the controller, the powertrain-side pump and stopping the battery-side pump, wherein the refrigerant circulating in the HVAC subsystem exchanges heat with the powertrain coolant having absorbed heat from the powertrain component, and wherein the powertrain-side pump operates at the fifth RPM.

8. The method according to claim 5, wherein the battery-side pump is configured to allow the battery coolant to pass through a battery radiator, the powertrain-side pump is configured to allow a powertrain coolant to pass through a powertrain component and a powertrain radiator, the battery radiator is configured to contact the ambient air, and the powertrain radiator is configured to contact the ambient air.

* * * * *